(12) United States Patent
Smallwood et al.

(10) Patent No.: US 9,958,159 B2
(45) Date of Patent: May 1, 2018

(54) COMBUSTOR ASSEMBLY FOR A GAS TURBINE ENGINE

(71) Applicants: Rolls-Royce North American Technologies, Inc., Indianapolis, IN (US); Rolls-Royce Corporation, Indianapolis, IN (US)

(72) Inventors: Michel S. Smallwood, Greenwood, IN (US); Mindi D. Wigal, Plainfield, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 889 days.

(21) Appl. No.: 14/102,929

(22) Filed: Dec. 11, 2013

(65) Prior Publication Data

US 2014/0311153 A1    Oct. 23, 2014

Related U.S. Application Data

(60) Provisional application No. 61/780,613, filed on Mar. 13, 2013.

(51) Int. Cl.
*F23R 3/00* (2006.01)
*F23R 3/60* (2006.01)

(52) U.S. Cl.
CPC .............. *F23R 3/002* (2013.01); *F23R 3/005* (2013.01); *F23R 3/60* (2013.01); *F23R 2900/00017* (2013.01); *Y02T 50/675* (2013.01)

(58) Field of Classification Search
CPC .... F23R 3/002; F23R 3/08; F23R 3/60; F23R 2900/00017; F23D 14/78; F23D 2214/00; F02K 1/822; F02K 1/80; F23C 5/02
See application file for complete search history.

(56) References Cited

U.S. PATENT DOCUMENTS

| 4,322,945 A | 4/1982 | Peterson et al. |
| 4,380,906 A | 4/1983 | Dierberger |
| 4,567,730 A * | 2/1986 | Scott ........................ F23R 3/007 |
| | | 60/752 |

(Continued)

FOREIGN PATENT DOCUMENTS

| FR | 2889732 A1 | 2/2007 |
| FR | 2935465 A1 | 3/2010 |

OTHER PUBLICATIONS

International Search Report for PCT/US2013/069772 dated Sep. 2, 2014.

(Continued)

*Primary Examiner* — Carlos A Rivera
*Assistant Examiner* — Marcos O Diaz
(74) *Attorney, Agent, or Firm* — Fishman Stewart PLLC

(57) ABSTRACT

A combustor assembly for a gas turbine engine includes a hanger and a combustor liner fixed to the hanger such as, for example, by an annular weld joint. The combustor liner has an inner surface extending along an axis and is operable to define either a radial outer boundary or a radial inner boundary of the combustion chamber. The combustor assembly also includes a heat shield at least partially overlapping and confronting the inner surface of the combustor liner along the axis, with the heat shield releasably engaged with the hanger.

20 Claims, 4 Drawing Sheets

(56) References Cited

U.S. PATENT DOCUMENTS

| | | | |
|---|---|---|---|
| 4,655,044 | A | 4/1987 | Dierberger et al. |
| 5,050,385 | A | 9/1991 | Hirose et al. |
| 5,129,231 | A | 7/1992 | Becker et al. |
| 5,291,732 | A * | 3/1994 | Halila ............... F23R 3/60 60/752 |
| 5,353,599 | A | 10/1994 | Johnson et al. |
| 5,398,509 | A | 3/1995 | North et al. |
| 5,509,270 | A | 4/1996 | Pearce et al. |
| 5,894,732 | A | 4/1999 | Kwan |
| 5,956,955 | A | 9/1999 | Schmid |
| 6,347,508 | B1 * | 2/2002 | Smallwood ......... F01D 9/023 60/796 |
| 6,679,063 | B2 | 1/2004 | Ebel |
| 7,509,813 | B2 | 3/2009 | Stastny |
| 7,861,530 | B2 | 1/2011 | Hawie et al. |
| 2003/0213249 | A1 | 11/2003 | Pacheco-Tougas et al. |
| 2004/0250548 | A1 * | 12/2004 | Howell ............... F23R 3/002 60/796 |
| 2008/0092546 | A1 | 4/2008 | Stastny et al. |
| 2009/0000303 | A1 | 1/2009 | Patel et al. |
| 2009/0090110 | A1 | 4/2009 | Pardington et al. |
| 2012/0198653 | A1 | 8/2012 | Tanner et al. |
| 2013/0042627 | A1 | 2/2013 | Gerendas et al. |

OTHER PUBLICATIONS

English Abstract for FR2889732A1.
English Abstract for FR2935465A1.

* cited by examiner

COMBUSTOR ASSEMBLY FOR A GAS TURBINE ENGINE

CROSS-REFERENCE TO RELATED APPLICATIONS

This application claims priority to U.S. Provisional Patent Application No. 61/780,613 filed Mar. 13, 2013, the contents of which are hereby incorporated in their entirety.

GOVERNMENT RIGHTS

The present application was made with United States government support under Contract No. N00019-04-C-0102, awarded by the United States Department of the Navy. The United States government has certain rights in the present application.

TECHNICAL FIELD

The invention generally relates to a combustor assembly for a gas turbine engine.

BACKGROUND

Providing combustor constructions for use in gas turbine engines remains an area of interest. Some existing systems have various shortcomings relative to certain applications. Accordingly, there remains a need for further contributions in this area of technology.

SUMMARY

In summary, the invention is generally directed to a combustor assembly for a gas turbine engine.

In one form of the invention, a combustor assembly for a gas turbine engine is provided. The combustor assembly includes a hanger, a combustor liner fixed to the hanger at an attachment location and the combustor liner having an inner surface extending along an axis and defining one of a radial outer boundary and a radial inner boundary of a combustion chamber, and a heat shield at least partially overlapping and confronting the inner surface of the combustor liner along the axis and with the heat shield releasably engaged with the hanger.

In another form of the invention, a method is provided including the steps of defining one of a radially outer boundary and a radially inner boundary of a combustion chamber with an inner surface of a combustor liner extending along an axis, fixing the combustor liner to a hanger at an attachment location, shielding at least part of the inner surface of the combustor liner with a heat shield at least partially overlapping and confronting the inner surface of the combustor liner along the axis, and releasably engaging the heat shield with the hanger.

In a further form of the invention, a gas turbine engine is provided including a compressor section operable to compress fluid, a combustor section positioned downstream of the compressor section along a centerline axis and defining a combustion chamber operable to receive the compressed fluid from the compressor section, and a turbine section positioned downstream of the combustor section along the centerline axis and operable to receive combustion gases from the combustion chamber. Additionally, the combustor section includes a combustor assembly comprising a hanger disposed at least partially radially outward or radially inward of the combustion chamber, a combustor liner fixed to the hanger at an attachment location and having an inner surface extending along the centerline axis and operable to define one of a radially outer and a radially inner boundary of the combustion chamber, and a heat shield at least partially overlapping and confronting the inner surface of the combustor liner along the centerline axis and with the heat shield releasably engaged with the hanger.

BRIEF DESCRIPTION OF THE DRAWINGS

Advantages of the present invention will be readily appreciated and better understood by reference to the following detailed description when considered in connection with the accompanying drawing figures.

DETAILED DESCRIPTION

The invention, as demonstrated by the exemplary embodiment described below, provides a heat shield arrangement in the combustor section of a turbine engine. In the exemplary embodiment, the heat shield is releasably connected to a static hanger. Several advantages flow from this arrangement including, for example, ease of replacement of the heat shield. Additionally, the heat shield may be designed to have a shorter lifespan relative to other components of the combustor section, thereby reducing the relative cost of the heat shield. The heat shield may be replaced by cutting fasteners which connect the heat shield to the hanger and installing a new heat shield, thereby allowing for replacement of the heat shield without damaging the combustor liner or negatively affecting the structural integrity of the combustor liner. Further, the releasable connection of the heat shield to the hanger can be provided such that the heat shield is moveable relative to the hanger, thereby permitting the heat shield to thermally expand and contract relative to the hanger. Additionally, the heat shield can replace potentially highly stressed effusion holes that would otherwise be provided in the hanger.

Figure 1:
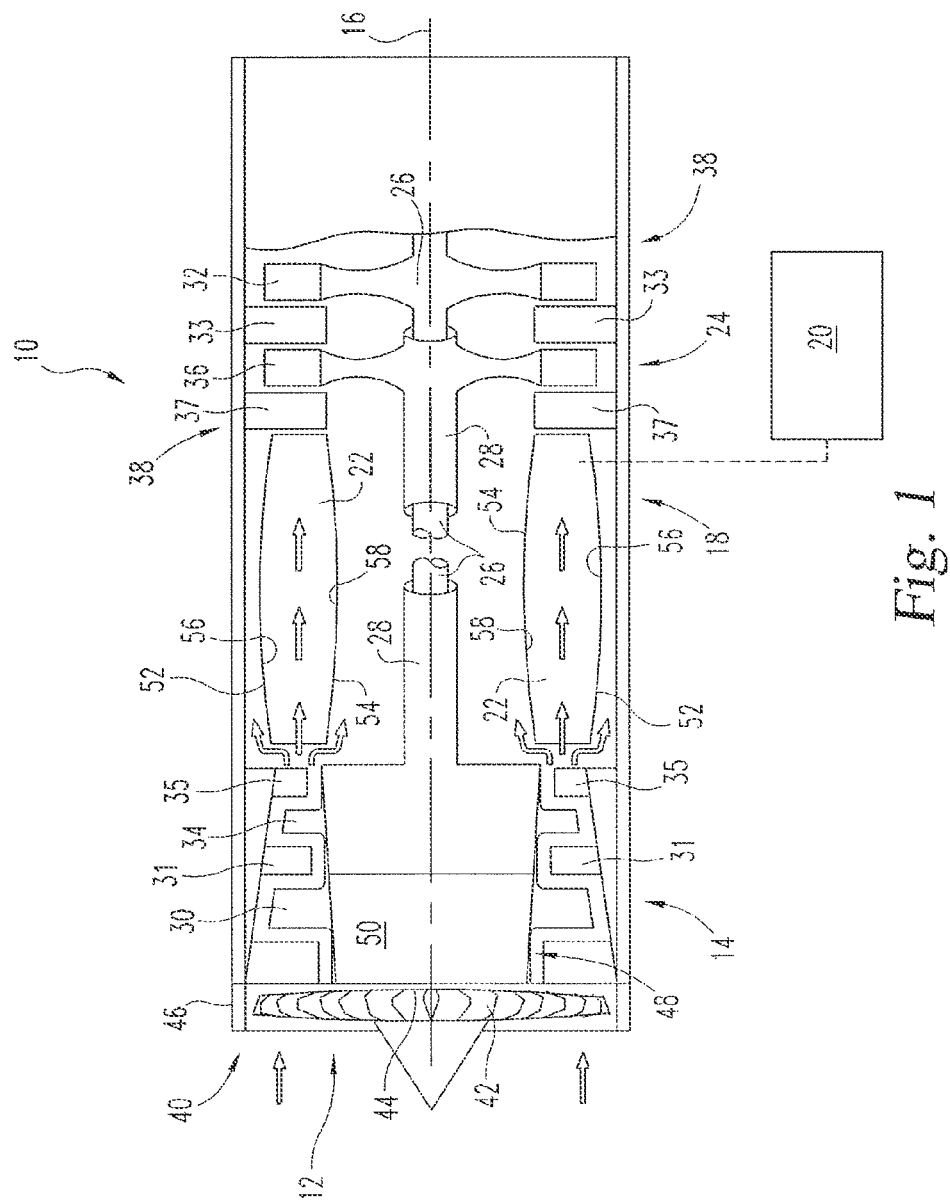
FIG. 1 is a schematic cross-section of a turbine engine incorporating one embodiment of the invention.

FIG. 1 schematically illustrates a turbine engine 10. The unnumbered arrows in FIG. 1 represent the flow of fluid through the turbine engine 10. The turbine engine 10 can produce power for several different applications including, without limitation, vehicle propulsion and power generation. It should be understood that the exemplary embodiment of the invention, as well as other embodiments of the invention, can be practiced in any configuration of a turbine engine and in applications other than a turbine engine.

In the illustrated embodiment, the turbine engine 10 includes an inlet 12 for receiving a fluid such as, for example, air, and a compressor section 14 that receives the fluid from the inlet 12 and compress the fluid. The compressor section 14 is spaced from the inlet 12 along a centerline axis 16 of the turbine engine 10. The turbine engine 10 further includes a combustor section 18 that receives the compressed fluid from the compressor section 14. The compressed fluid is mixed with fuel from a fuel system 20 and the mixture is ignited in an annular combustion chamber 22 provided in the combustor section 18. The turbine engine 10 also includes a turbine section 24 that receives the combustion gases from the combustor section 18. The energy associated with the combustion gases is converted into kinetic energy (motion) in the turbine section 24. A pair of nested shafts 26, 28 are disposed for rotation about the centerline axis 16 of the turbine engine 10. In the illustrated embodiment, the shaft 28 encircles the shaft 26. However, alternative embodiments can include any number of shafts and other shaft arrangements. Additionally, the shafts 26, 28 may be journaled together for rotation relative to one another about the centerline axis 16 including bearings disposed between the shafts 26, 28 to permit relative rotation therebetween.

In the illustrated embodiment of the turbine engine 10, the shaft 26 can be a low pressure shaft supporting a number of compressor blades 30 positioned in a low pressure portion of the compressor section 14. The compressor blades 30 can be part of a bladed disk assembly 48 fixed for rotation with the low pressure shaft 26. The bladed disk assembly 48 is shown schematically in FIG. 1 and includes a disk or rotor 50 fixed to the low pressure shaft 26 for concurrent rotation. The disk 50 may in turn include a plurality of grooves (not shown), with each groove sized and shaped to receive one of the blades 30 to attach the blades 30 to the disk 50. One or more vanes 31 can be positioned to receive fluid from the low pressure blades 30 and to direct fluid downstream of the blades 30. The low pressure shaft 26 can also support a number of low pressure turbine blades 32 positioned in a low pressure portion of the turbine section 24 of the turbine engine 10. One or more vanes 33 can be positioned forward of the blades 32 to direct combustion gases over the blades 32.

In the illustrated embodiment of the turbine engine 10, the shaft 28 can be a high pressure shaft supporting a number of compressor blades 34 positioned in a high pressure portion of the compressor section 14. The high pressure blades 34 can be part of a bladed disk assembly similar to the bladed disk assembly 48 described above with respect to the low pressure blades 30. One or more vanes 35 can be positioned to receive fluid from the high pressure blades 34 to direct fluid downstream of the blades 34 to the combustor section 18. The high pressure shaft 28 can also support a number of high pressure turbine blades 36 positioned in a high pressure portion of the turbine section 24 of the turbine engine 10. One or more vanes 37 can be positioned between the combustor section 18 and the blades 36 to direct combustion gases over the blades 36.

In the illustrated embodiment of the turbine engine 10, the compressor section 14 defines a multi-stage compressor. A "stage" of the compressor section 14 can be defined as a pair of axially adjacent blades and vanes. For example, the blades 30 and the vanes 31 can define a first low pressure stage of the compressor section 14, and the blades 34 and the vanes 35 can define a second high pressure stage of the compressor section 14. However, it should be understood that the compressor section 14 can be provided with any number of compressor stages. In another embodiment of the turbine engine 10, the turbine section 24 defines a multi-stage turbine. For example, the blades 36 and the vanes 37 can define a first high pressure stage of the turbine section 24, and the blades 32 and the vanes 33 can define a second low pressure stage of the turbine section 24. However, it should be understood that the turbine section 24 can be provided with any number of turbine stages.

In the illustrated embodiment of the turbine engine 10, a casing 38 defines a first annular wall that is positioned to surround at least some of the components of the turbine engine 10. The exemplary casing 38 can encircle the compressor section 14, the combustor section 18, and/or the turbine section 24. In alternative embodiments, the casing 38 may encircle less than all of the compressor section 14, the combustor section 18 and/or the turbine section 24. For example, multiple structures that encircle part of the turbine engine 10 can define a casing.

In the illustrated embodiment of the turbine engine 10, a fan section 40 may be positioned forward of the compressor section 14 along the centerline axis 16. The fan section 40 can include a plurality of fan blades 42 extending radially outward from a hub 44. The fan 40 can be encircled by a fan case 46, which can in turn be fixed to the casing 38. The casing 38 is shown schematically as a single structure. However, other configurations are also contemplated wherein the casing 38 may be provided as multiple pieces or sections that are integrated together. The forward-most member can be designated as a "front frame", and the fan case 46 can be mounted to the front frame portion of the casing 38.

In the illustrated embodiment of the turbine engine 10, the combustor section 18 includes an outer liner 52 and an inner liner 54, with the outer liner 52 encircling the inner liner 54 to define the annular combustion chamber 22. The annular combustion chamber 22 is defined by the volume between the outer liner 52 and the inner liner 54. The outer liner 52 includes an inner surface 56 extending along the centerline axis 16 and which defines a radial outer boundary of the combustion chamber 22. The inner liner 54 includes an inner surface 58 extending along the centerline axis 16 and which defines a radial inner boundary of the combustion chamber 22.

Figure 2:
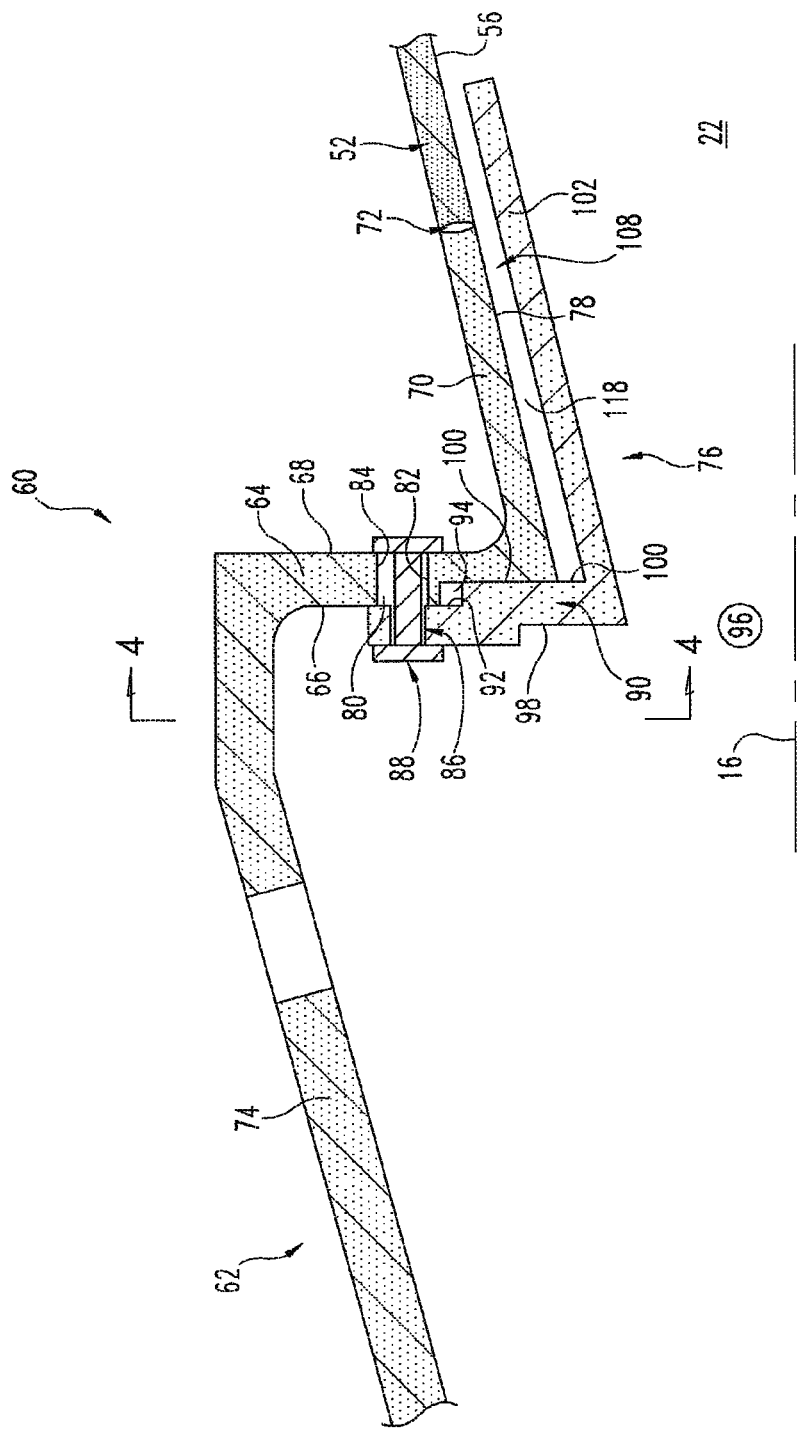
FIG. 2 is a cross-sectional view showing an arrangement for mounting an outer combustor liner in the turbine engine via a hanger and showing a heat shield according to one embodiment of the invention releasably engaged to the hanger, as taken along line 2-2 of FIG. 4.
Figure 3:
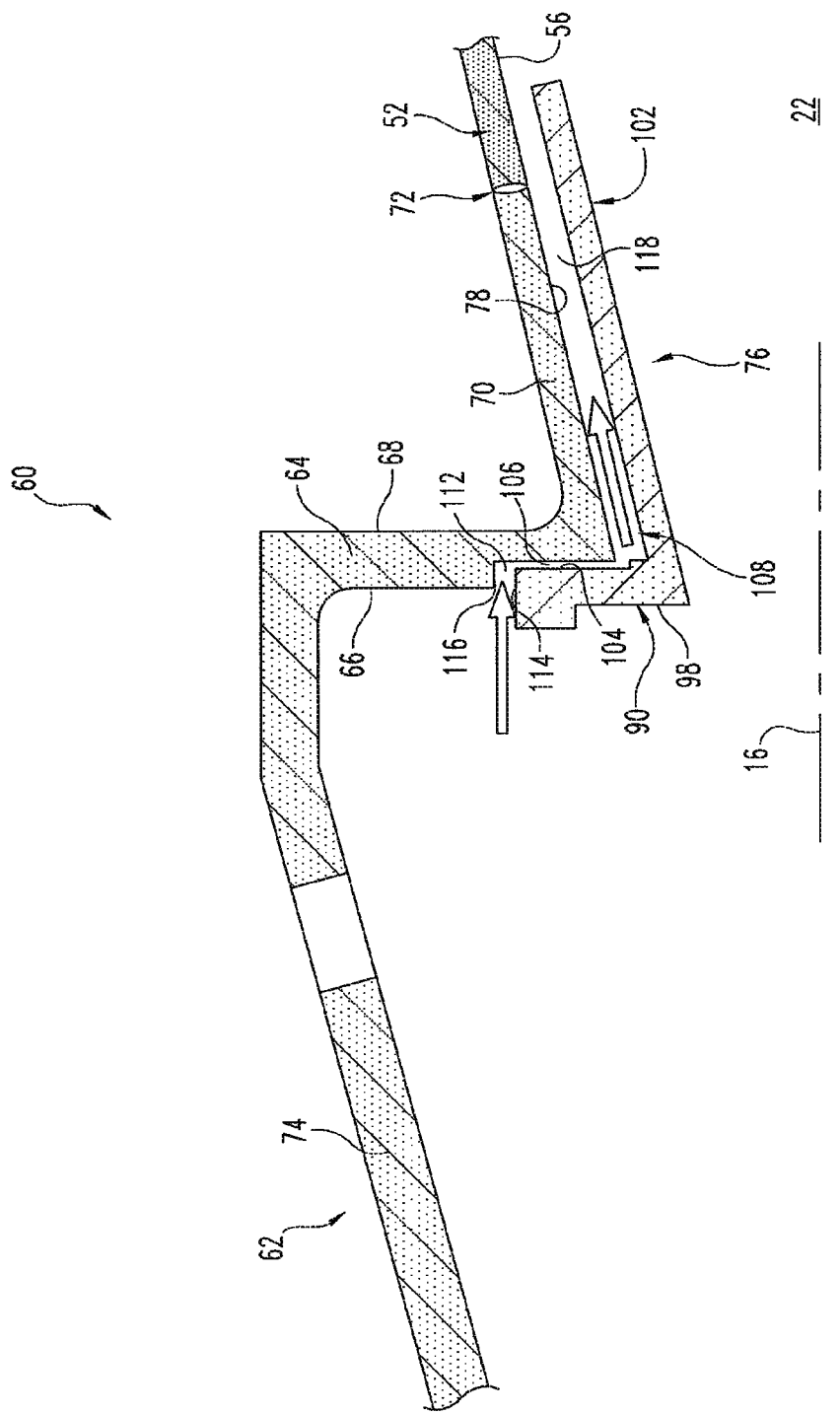
FIG. 3 is a cross-sectional view showing the arrangement for mounting the outer combustor liner in the turbine engine via the hanger and showing the heat shield releasably engaged to the hanger, as taken along line 3-3 of FIG. 4.
Figure 4:
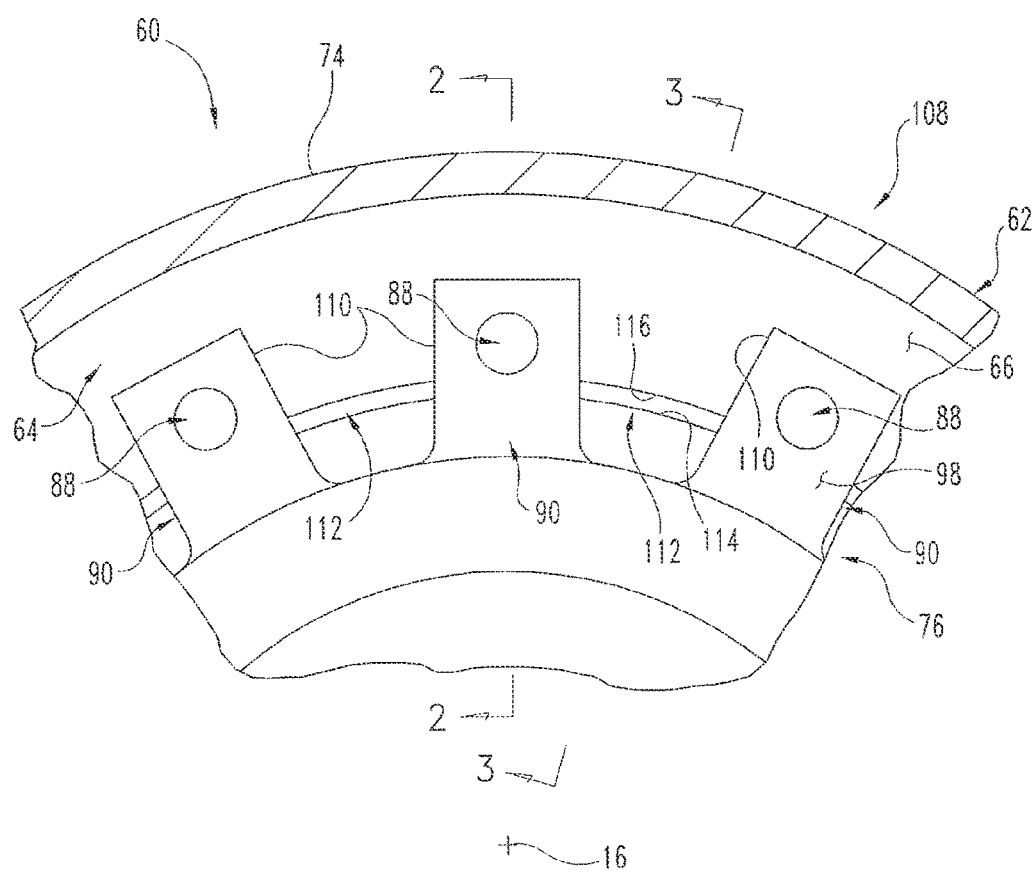
FIG. 4 is partial view of the combustor section of the turbine engine from a position forward of the arrangement for mounting the outer combustor liner in the turbine engine via the hanger and with the heat shield releasably engaged to the hanger.

While FIG. 1 illustrates a schematic representation of the turbine engine 10, FIGS. 2 and 3 illustrate detailed cross-sectional views of an arrangement for mounting the outer combustor liner 52 to a static structure of the turbine engine 10 such as, for example, the casing 38 shown in FIG. 1. As shown in FIG. 4, the cross-sections illustrated in FIGS. 2 and 3 are taken along planes containing the centerline axis 16. The respective planes associated with FIGS. 2 and 3 are offset circumferentially or angularly relative to one another. FIGS. 2 and 3 also show a combustor assembly 60 according to one embodiment of the invention. The combustor assembly 60 generally includes a hanger 62 disposed at least partially radially outward from the combustion chamber 22. Additionally, another hanger (not shown) engaging the inner liner 54 of the combustor section 18 would similarly be disposed at least partially radially inward from the combustion chamber 22.

As should be appreciated, the hanger 62 can perform different functions in the turbine engine 10. For example, the exemplary hanger 62 can provide mounting support for the outer combustor liner 52. A mounting element or stake (not shown) may be threaded into an adapter or another structure associated with the outer casing 38 adjacent the combustor section 18, with the mounting element arranged to travel through respective bosses in the outer hanger 62 and the inner hanger (not shown), and then into an inner combustor casing (not shown). This mounting element or stake may hold the components of the combustor section 18 in place, and also keeps the inner and outer liners 54 and 52 at a substantially fixed axial location along the centerline axis 16. The hanger 62 can also provide additional stiffness to the walls of the outer liner 52. At should be appreciated, the liner walls may be somewhat flexible, and the hanger 62 may provide a degree of stiffening to the outer liner 52.

In the illustrated embodiment, the hanger 62 may be positioned downstream of the compressor section 14 and upstream of the combustor liners 52, 54 of the combustor section 18. The hanger 62 includes a first portion or radial flange portion 64 extending radially relative to the centerline axis 16. The radial flange portion 64 has a forward face 66 and an oppositely facing aft face 68. The hanger 62 also includes a second portion or axial flange portion 70 extending generally along the centerline axis 16 from the radial flange portion 64 in an aft direction. The axial flange portion 70 extends to an annular weld joint 72. The annular weld joint 72 joins the aft end of the hanger 62 with the forward end of the outer liner 52. The exemplary hanger 62 also includes a third portion or second axial flange portion 74 extending forward from the radial flange portion 64 generally along the centerline axis 16. The mounting element or stake discussed above may pass through the second axial flange portion 74.

In one embodiment, the hanger 62 and the liner 52 can both be formed from a high temperature metal alloy such as, for example, Haynes 230 alloy. Haynes 230 alloy is an industrial alloy for applications demanding high strength as well as resistance to high temperatures, and displays a desirable combination of strength, stability, thermal resistance and manufacturability. Haynes 230 alloy is resistant to oxidation, combustion environments and nitriding. Additionally, the hanger 62 can be effusion cooled during manufacture, and the liner 52 can be formed of Lamilloy.

In the illustrated embodiment, the combustor assembly 60 also includes a heat shield 76 at least partially overlapping and confronting or facing the inner surface 56 of the liner 52 along the centerline axis 16. The heat shield 76 confronts the inner surface 56 of the liner 52 in that the heat shield 76 and the inner liner surface 56 face or oppose one another. The confronting surfaces can be in contact with one another or can be spaced from one another. In the exemplary embodiment, the heat shield 76 and the inner surface 56 of the liner 52 are spaced apart from one another by a distance to define a gap therebetween. In various embodiments of the invention, the heat shield 76 and the inner surface 56 can be radially spaced from one another along all or less than all of the length of the heat shield 76 along the centerline axis 16. In the illustrated embodiment, the heat shield 76 and the inner surface 56 are radially spaced from one another along the full length over which the heat shield 76 and the inner surface 56 overlap along the centerline axis 16. Specifically, the heat shield 76 overlaps the axial flange portion 70 of the hanger 62 along the centerline axis 16 and is spaced from an inner surface 78 of the axial flange portion 70. The heat shield 76 may thus extend substantially parallel with the axial flange portion 70 of the hanger 62 and the outer liner 52 along the centerline axis 16. The heat shield 76 may also overlap the annular weld joint 72 joining the axial flange portion 70 and the outer liner 52.

In the illustrated embodiment, the heat shield 76 is releasably engaged with the hanger 62 and may be exposed to higher temperatures relative to the hanger 62. As should be appreciated, releasable engagement of the heat shield 76 with the hanger 62 facilitates replacement of the heat shield 76. Additionally, a plurality of successive replacement heat shields 76 can be applied over the single life of the hanger 62. Additionally, in one embodiment, the hanger 62 and the heat shield 76 are operable to move relative to one another while being releasably engaged to one another. In the illustrated embodiment, the hanger 62 includes a plurality of slots 80 arranged about the centerline axis 16, with each of the slots 80 having a length extending radially between a radially inner end 82 and a radially outer end 84. Additionally, the heat shield 76 includes a plurality of apertures 86 arranged about the centerline axis 16. Each slot 80 may be circumferentially aligned with a respective one of the apertures 86, with a bolt or fastener 88 extending through aligned pairs of the slot 80 and the aperture 86 to releasably connect the heat shield 76 to the hanger 62, while allowing relative movement between the heat shield 76 and the hanger 62.

In the illustrated embodiment, the heat shield 76 may be formed in three segments, with each segment extending approximately 120° about the centerline axis 16, and with the segments assembled to the hanger 62 at the fastener locations 88. These segments can partially overlap at the fastener locations 88. It should be appreciated that the heat shield 76 is not intended to constitute a structural load-supporting component, so strength is not of primary concern, but the overlap will nonetheless enhance sealing and stiffness. The portion of the heat shield 76 located inward of the liner 52 may be provided with small slots (not shown) extending along the centerline axis 16 for stress relief. Additionally, the heat shield 76 can also be coated with a thermal barrier coating on at least the side of the heat shield facing the combustion chamber 22. For reference, a fuel nozzle may be positioned at or adjacent the location referenced at 96.

In the illustrated embodiment, the heat shield 76 includes a radial flange portion 90 and an axial flange portion 102 extending from the radial flange portion 90 in an aft direction generally along the centerline axis 16. The radial flange portion 90 of the heat shield 76 includes a forward face 98 and an oppositely facing aft face 100. The forward face 66 of the hanger 62 contacts the aft face 100 of the heat shield 76. Additionally, as shown in FIG. 2, one of the forward face 66 of the hanger 62 and the aft face 100 of the heat shield 76 includes a plurality of recesses 92 such that a plurality of radial gaps 94 are defined between the forward face 66 and the aft face 100.

As shown in FIG. 3, in the illustrated embodiment, recesses 104 are formed in the aft face 100 of the heat shield 76, and a radial gap 106 is formed between the bottom of the recess 104 and the forward face 66 of the hanger 62. A plurality of recesses, such as recess 104, can be positioned about the centerline axis 16. In one embodiment, the recesses 104 may contribute to thermally isolating the heat shield 76 from the hanger 62. In the illustrated embodiment, the heat shield 76 only physically contacts the radial flange portion 64 of the hanger 62, and the recesses 104 reduce the area of contact between the heat shield 76 and the hanger 62 to reduce conductive heat transfer therebetween. Additionally, in the illustrated embodiment, the radial gaps 106 are positioned radially inward of the plurality of fastener locations 88. As a result, the area of contact between the hanger 62 and the heat shield 76 at the radial position of the fastener locations 88 (i.e., the location where the two structures are connected together) can be greater than the area of contact radially inward of the fastener locations 88 where the temperature progressively increases. As should be appreciated, greater contact area at the radial position of the fastener locations 88 enhances stability, and lesser contact area radially inward of the fastener locations 88 enhances thermal isolation of the two structures (i.e., the heat shield 76 and the hanger 62) relative to one another.

As also shown in FIG. 3, each of the recesses 104 can define a portion of a cooling fluid passageway 108 for communicating cooling fluid to cool the heat shield 76 and the inner surface 56 of the outer liner 52. Cooling fluid constitutes fluid that is at a lower temperature than fluid within the combustion chamber 22. In the illustrated embodiment, a portion of the fluid exiting the compressor section 14 passes into the combustion chamber 22 and a portion is diverted to provide cooling fluid to the cooling fluid passageways 108 defined between the heat shield 76 and the hanger 62. The cooling fluid passageway 108 can include an inlet area, as best shown in FIG. 4. In the illustrated embodiment, the radial flange portion 90 of the heat shield 76 can include a plurality of radial notches 110. Each of the radial notches 110 can be positioned between adjacent pairs of the plurality of fastener locations 88. Each radial notch 110 is in fluid communication with the radially-extending gap 106 via an axially-extending gap 112, which can also constitute a portion of the fluid passageway 108. The axially-extending gap 112 can be bounded by a radially outer surface 114 defined by the heat shield 76 and by a radially inner surface 116 defined by the hanger 62. As noted above, the heat shield 76 can expand and contract relative to the hanger 62. However, the heat shield 76 and hanger 62 can be designed such that the axially-extending gap 112 is always at least partially open. The size of the axially-extending gap 112 can be minimized so that the notch 110 is located substantially immediately upstream of one or more of the radially-extending gap 106.

The radially-extending gap 106 communicates fluid to an axially-extending gap 118, which can also be considered part of the cooling fluid passageway 108. The axially-extending gap 118 first extends along the centerline axis 16, bound on opposites sides by the hanger 62 and the heat shield 76, and then extends between the heat shield 76 and the inner surface 56 of the liner 52. As noted above, the heat shield 76 can expand and contract relative to the hanger 62, thus varying a size of the axially-extending gap 118. Variations in the size of the axially-extending gap 118 can affect the characteristics of fluid flow through the cooling fluid passageway 108. For example, the velocity of the fluid can increase as the size of the axially-extending gap 118 decreases, assuming the pressure differential over the cooling fluid passageway 108 remains substantially constant.

While the invention has been described with reference to an exemplary embodiment, it will be understood by those skilled in the art that various changes may be made and equivalents may be substituted for elements thereof without departing from the scope of the invention. In addition, modifications may be made to adapt a particular situation or material to the teachings of the invention without departing from the scope of the invention. Therefore, it is intended that the invention not be limited to the particular embodiment(s) disclosed herein, but that the invention will include all embodiments falling within the scope of the appended claims. Further, the "invention", as that term is used in this document, refers to the subject matter set forth in the claims of this document. The right to claim elements and/or sub-combinations that are disclosed herein as other inventions in other patent documents is hereby unconditionally reserved.

The invention claimed is:

1. A combustor assembly for a gas turbine engine, comprising: a hanger having a first flange portion extending radially inward therefrom, said first flange portion forming a step including a first wall portion at a first wall thickness and a second wall portion at a second wall thickness that is less than said first wall thickness;
   a combustor liner fixed to said hanger, said combustor liner having an inner surface extending along an axis of a combustion chamber;
   a heat shield having a-second flange portions extending radially outward therefrom, said second flange portion in contact with said first wall portion and said second wall portion of said first flange portion, said heat shield at least partially overlapping and confronting said inner surface of said combustor liner along said axis to form an axially extending gap, said heat shield releasably engaged with said hanger, said heat shield forming a plurality of radially outer surfaces between said second flange portions, said radially outer surfaces oppose said first wall portion to form circumferentially extending gaps between said second flange portions, said heat shield forming recesses that oppose said second wall portion to form radially extending gaps, such that air flow passes from the circumferentially extending gaps into said radially extending gaps and into said axially extending gap; and
   fasteners passing through said first flange portion and said second flange portions and extending in a direction parallel with said axis.

2. The combustor assembly of claim 1 wherein said combustor liner is joined with said hanger at an attachment location by an annular weld joint, and wherein said heat shield overlaps said annular weld joint along said axis.

3. The combustor assembly of claim 1 wherein said hanger and said heat shield are operable to move relative to one another while releasably engaged with one another.

4. The combustor assembly of claim 3 wherein said hanger includes a slot having a slot length extending between a radially inner end and a radially outer end, wherein said heat shield includes an aperture, and wherein said fastener extends through said slot and said aperture along said axis to releasably connect said heat shield with said hanger and to allow relative radial movement between said heat shield and said hanger.

5. The combustor assembly of claim 2 wherein said hanger further comprises:
   a first axial portion extending along said axis from said first flange portion to said annular weld joint, said heat shield overlapping all of a second axial portion of said hanger.

6. The combustor assembly of claim 5 wherein said heat shield only physically contacts said first flange portion of said hanger and is spaced from and does not contact said second axial portion of said hanger.

7. The combustor assembly of claim 1 further comprising: at least one fluid passageway communicating cooling fluid to said axially extending gap defined between said heat shield and said inner surface of said combustor liner.

8. The combustor assembly of claim 7 wherein said at least one fluid passageway includes a portion bounded by said radially outer surfaces defined by said heat shield and by a radially facing inner surface defined by said hanger.

9. The combustor assembly of claim 7 wherein said at least one fluid passageway includes a portion extending along said axis and respectively bounded on opposites sides by an inner surface of said hanger and an outer surface of said heat shield.

10. The combustor assembly of claim 7 wherein said hanger and said heat shield are operable to move relative to one another while releasably engaged with one another, thereby varying a size of said axially extending gap between said heat shield and said inner surface of said combustor liner.

11. A method comprising the steps of:
defining of a combustion chamber with an inner surface of a combustor liner extending along an axis;
fixing the combustor liner to a hanger, the hanger having a first flange portion extending radially inward therefrom, said first flange portion forming a step including a first wall portion at a first wall thickness and a second wall portion at a second wall thickness that is less than said first wall thickness;
shielding at least part of the inner surface of the combustor liner with a heat shield, the heat shield having second flange portions extending radially outward therefrom, the second flange portions in contact with said first wall portion and said second wall portion of the first flange portion, the heat shield at least partially overlapping and confronting the inner surface of the combustor liner along the axis to form an axially extending gap, said heat shield forming a plurality of radially outer surfaces between said second flange portions, said radially outer surfaces oppose said first wall portion to form circumferentially extending gaps between said second flange portions, said heat shield forming recesses that oppose said second wall portion to form radially extending gaps, such that air flow passes from the circumferentially extending gaps into said radially extending gaps and into said axially extending gap; and
releasably engaging the heat shield with the hanger.

12. The method of claim 11 wherein the fixing of the combustor liner to the hanger comprises joining the combustor liner to the hanger by an annular weld joint.

13. The method of claim 11 further comprising the steps of:
coupling the heat shield and the hanger together such that the heat shield is at least partially free to expand and contract relative to the hanger in response to changes in temperature; and
limiting free expansion and contraction of the heat shield relative to the hanger such that said axially extending gap is maintained between the heat shield and the inner surface of the combustor liner.

14. The method of claim 11 further comprising the step of:
directing a stream of cooling fluid to said radially extending gaps between the first flange portion and the recesses, and from said radially extending gaps to said axially extending gap between the heat shield and the inner surface of the combustor liner; and
cooling the inner surface of the combustor liner and the heat shield with the cooling fluid.

15. A gas turbine engine comprising:
a compressor section operable to compress fluid;
a combustor section positioned downstream of said compressor section along a centerline axis and defining a combustion chamber operable to receive compressed fluid from said compressor section; and
a turbine section positioned downstream of said combustor section along said centerline axis and operable to receive combustion gases from said combustion chamber;
wherein said combustor section includes a combustor assembly comprising:
a hanger having a first flange portion extending radially inward therefrom, said first flange portion forming a step including a first wall portion at a first wall thickness and a second wall portion at a second wall thickness that is less than said first wall thickness;
a combustor liner fixed to said hanger, said combustor liner having an inner surface extending along said centerline axis; and
a heat shield at least partially overlapping and confronting said inner surface of said combustor liner along said centerline axis to form an axially extending gap, said heat shield having a second flange portions extending radially outward therefrom, said second flange portions in contact with of said first wall portion and said second wall portion of said first flange portion, said heat shield releasably engaged with said hanger, said heat shield forming a plurality of radially outer surfaces between said second flange portions, said radially outer surfaces oppose said first wall portion to form circumferentially extending gaps between said second flange portions, said heat shield forming recesses that oppose said second wall portion to form radially extending gaps, such that air flow passes from the circumferentially extending gaps into said radially extending gaps and into said axially extending gap; and
fasteners passing through said first flange portion and said second flange portions and extending in a direction parallel with said centerline axis.

16. The gas turbine engine of claim 15 wherein:
said hanger includes said first flange portion and an axial flange portion, said axial flange portion of said heat shield extending along said centerline axis from said first flange portion to an annular weld joint defining an attachment location between said combustor liner and said hanger;
said heat shield includes said second flange portions and an axial flange portion, said axial flange portion of said heat shield extending along said centerline axis from said second flange portions of said heat shield; and
said forward face of said hanger facing the recesses to define the plurality of radially extending gaps.

17. The gas turbine engine of claim 16 further comprising:
a plurality of fasteners extending through aligned openings in said first flange portion of said hanger and said second flange portions of said heat shield;
wherein said plurality of radially extending gaps are positioned fully radially inward of said plurality of fasteners; and
wherein said axially extending gap is defined between said axial flange portion of said hanger and said axial flange portion of said heat shield, said axially extending gap in fluid communication with said plurality of radially extending gaps.

18. The combustor assembly of claim 5 wherein said first axial portion extends from said first flange portion at a first radial distance from said axis, and overlaps along all of said second axial portion of said hanger and extends outward radially to a second radial distance that is greater than said first radial distance.

19. The method of claim 12 wherein the hanger includes a first axial portion that extends along the axis from the first flange portion at a first radial distance from the axis, extends to the annular weld joint, and the heat shield overlaps a second axial portion of the hanger and extends outward radially to a second radial distance that is greater than the first radial distance.

20. The gas turbine engine of claim 15 wherein said hanger includes a first axial portion that extends along said centerline axis from said first flange portion at a first radial distance from said centerline axis, and said heat shield overlaps a second axial portion of said hanger and extends outward radially to a second radial distance that is greater than said first radial distance.

* * * * *